March 19, 1940.   O. F. CARLSON   2,194,276
VALVE
Filed March 7, 1938   3 Sheets-Sheet 1
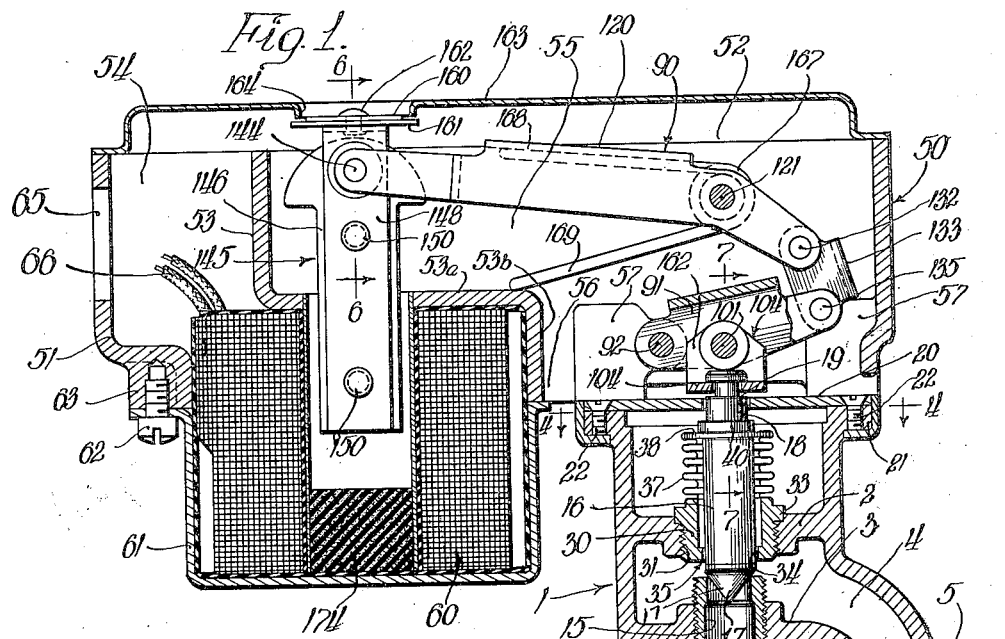
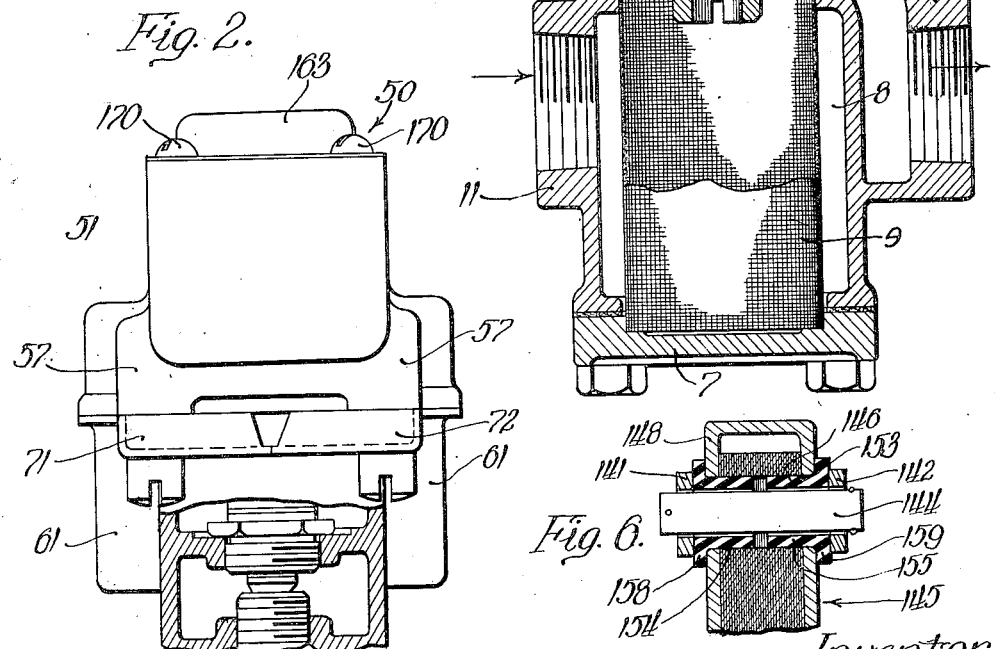
Inventor:
Oscar F. Carlson
By [signature]
Attys

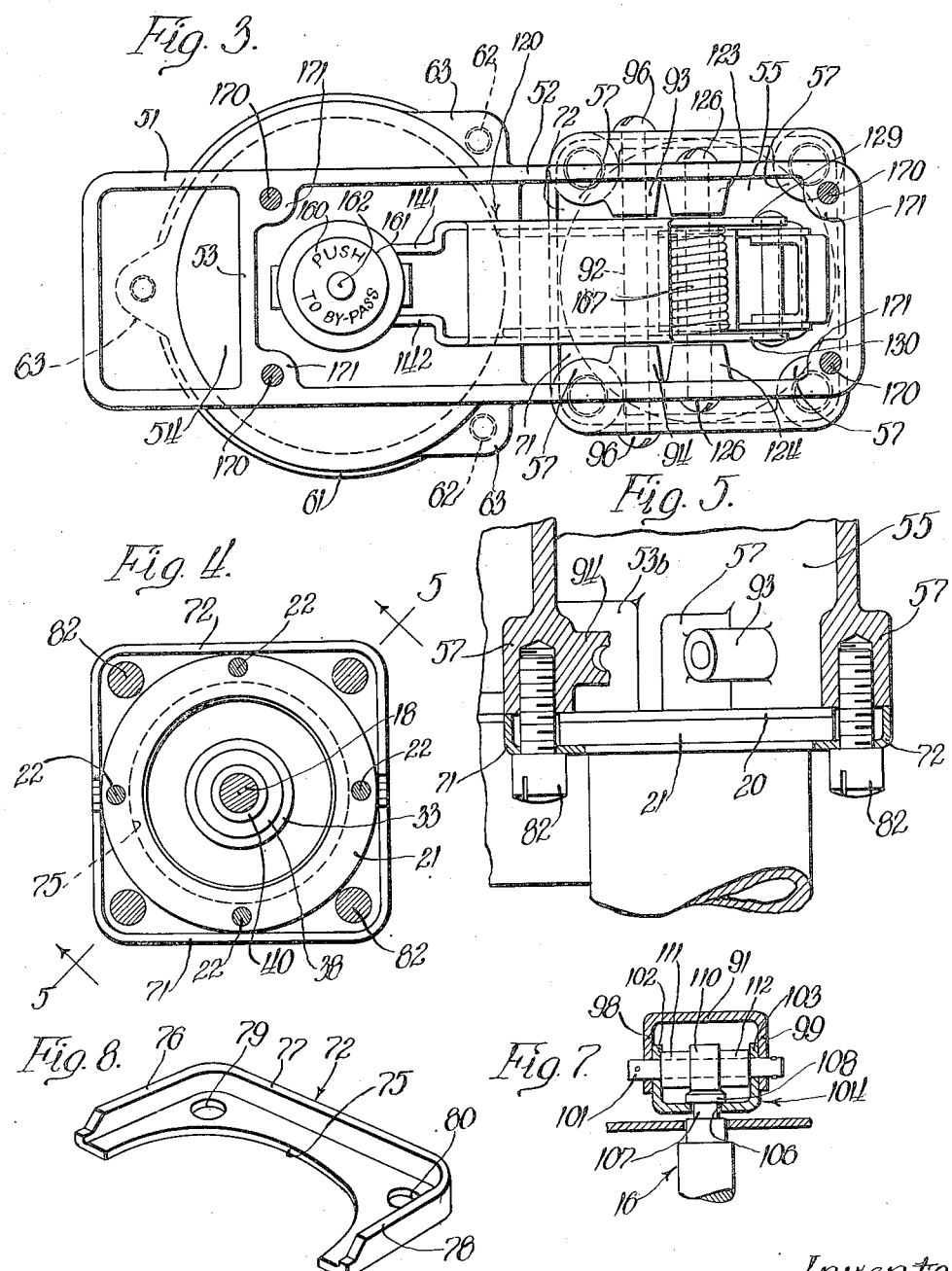

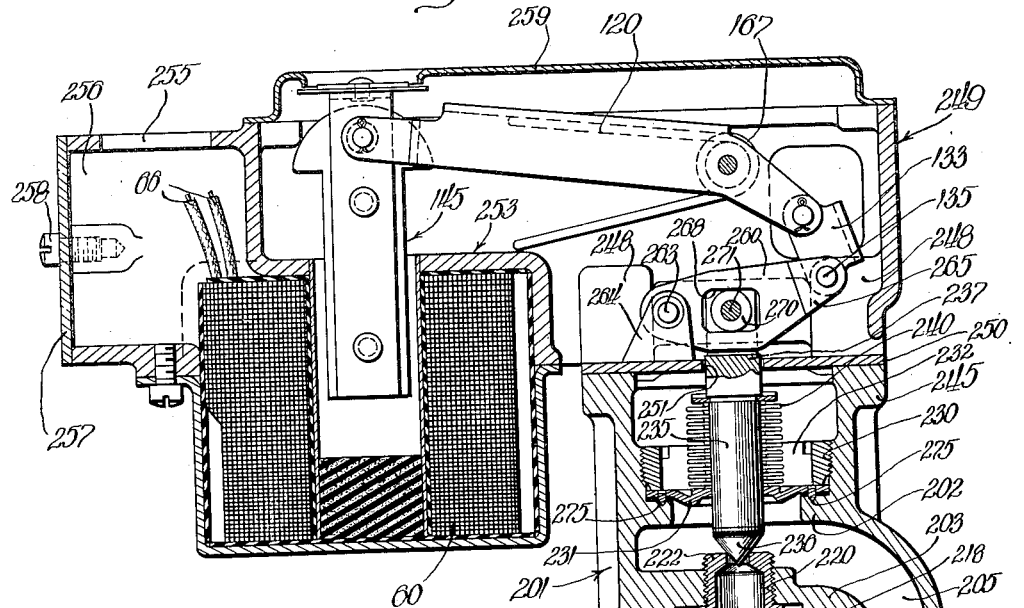
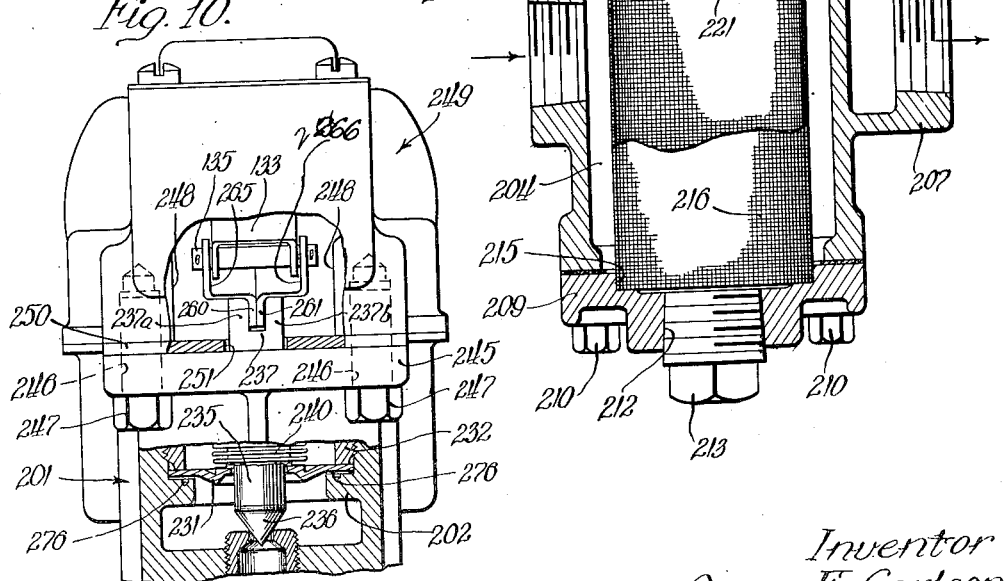

Patented Mar. 19, 1940

2,194,276

UNITED STATES PATENT OFFICE 2,194,276

VALVE

Oscar F. Carlson, Kenilworth, Ill., assignor of one-half to Oscar F. Carlson Company, Chicago, Ill., a corporation of Illinois, and one-half to Everett N. McDonnell, Chicago, Ill.

Application March 7, 1938, Serial No. 194,365

2 Claims. (Cl. 137—139)

This invention relates to valve assemblies and is more particularly concerned with electrically operated valves and the like.

One of the principal objects of this invention is the provision of a movable valve which is provided with a sealing bellows which acts, not only as a seal, but also as a dashpot to prevent sudden closing of the valve. The particular advantage of having the sealing bellows serve also as a dashpot is that, without extraneous parts, water hammer is effectively eliminated by preventing the valve from closing too suddenly. This is especially advantageous in connection with electrically operated valves and particularly where the operating means for the valve consists of releasable mechanism which, when released, applies a sudden force for closing the valve, as distinguished from hand operated valves or the like, where the rate of closing is relatively slow.

A further object of the present invention, particularly in connection with a bellows-sealed valve, is the provision of a swivel connection and a housing construction which can accommodate different installation conditions by permitting the valve housing to be turned to different positions relative to the casing or other supporting part to which the valve housing is connected, the swivel connection accommodating this adjustment while permitting the valve, which is sealed by the dashpot bellows, to be adjusted with the valve housing.

These and other objects and advantages of this invention will be apparent after a consideration of the following detailed description of the preferred embodiment, taken in conjunction with the accompanying drawings illustrating the same.

In the drawings:

Figure 1 is a central section taken through a valve assembly embodying the principles of this invention;

Figure 2 is a fragmentary end view of the valve construction shown in Figure 1;

Figure 3 is a top view of the construction shown in Figure 1, the cover being removed;

Figure 4 is a section taken along the line 4—4 of Figure 1;

Figure 5 is a diagonal section taken along the line 5—5 of Figure 4;

Figure 6 is a section taken along the line 6—6 of Figure 1;

Figure 7 is an enlarged section taken along the line 7—7 of Figure 1;

Figure 8 is a perspective view of one of the clamping members holding the valve housing in place; and Figures 9 and 10 show a modified form of valve assembly embodying certain features of the present invention.

Referring now more particularly to Figure 1, the valve assembly constructed according to the principles of the present invention embodies a valve housing 1 having wall means 2 and 3 between which an outlet chamber 4 is defined. An apertured threaded boss 5 provides for the connection thereto of the fluid line in which the assembly is incorporated. The lower portion of the valve housing 1 is closed by a plate 7 and forms a chamber 8 in which a strainer 9 is disposed. The chamber 8 has an inlet 11 in the form of an apertured threaded boss.

The wall 3 of the valve housing 1 is provided with a screw threaded plug 15 of hard material, such as stainless steel, and serves as a valve seat for a reciprocable valve 16 which has a lower tapered end 17 preferably formed of stainless steel or the like. The upper end of the valve 16 has a reduced section 18 which passes through an opening 19 in the central portion of a circular plate 20 which is fastened to the flange 21 at the upper end of the housing 1 by any suitable means, such as screws 22. The upper portion of the valve 16 is connected by swivel means to suitable operating linkage which will be described later.

The valve 16 extends through a guide bushing 30 which is screwed into a threaded opening 31 in the housing wall 2 in alignment with the valve seat 15. The guide bushing 30 is shouldered, as at 33, and has an inwardly extending flange section 34, which clears the valve 18 by a small amount, as indicated at 35. A sealing bellows 37 has a head 38 which is soldered or otherwise fixed to the valve 16, preferably against a small shoulder 40 at the upper end of the valve, and the lower open end of the sealing bellows 37 is soldered or otherwise fixed to the upper end of the guide bushing 30.

The valve 16 is moved toward or away from its seat 15 by axial reciprocation thereof, and during such movement of the valve 16 the bellows 37 acts as a dashpot to restrain sudden movement of the valve, particularly in a closing direction. To this end, the clearance 35 is large enough to admit fluid from the outlet chamber 4 into the interior of the bellows 37, but the clearance 35 is nevertheless small enough to provide the desired restraint upon sudden movements of the valve 16. This action is secured, of course, without interfering with the action of the bellows 37 in sealing the opening in the valve housing 1 through which the valve 16 extends. In this connection it is to be noted that the bellows 37 is not subjected to the inlet pressure but only to the outlet pressure in the chamber 4, which is, of course, smaller than the inlet pressure in the chamber 8.

The mechanism for operating the valve 16 is carried within a casing 50 that is mounted at the upper end of the valve housing 1. The casing 50 includes an elongated housing, preferably a casting 51, which has an open upper end 52, an intermediate wall 53 dividing the casting into two chambers 54 and 55, the latter having an open lower end portion 56, provided with apertured downwardly facing bosses 57, the opening 56 being generally square and the bosses 57 being at the corners thereof, as indicated in Figures 3 and 4. The intermediate dividing wall 53 is extended horizontally, as at 53a, and downwardly, as at 53b, to provide a chamber receiving the solenoid 60, the solenoid 60 being supported in position by a pressed metal cup 61 or the like fastened to the casing 51 by three screws 62, as best shown in Figures 1 and 3, threaded into apertured bosses 63, as best shown in Figures 1 and 3. The casing 50 is provided with an opening 65 adjacent the solenoid so as to accommodate conductors, such as those indicated at 66, for delivering current to solenoid 60.

The valve housing 1 and the casing 51 are fastened together by means best shown in Figures 2, 4, and 5. A pair of companion clamping members 71 and 72, one of which is shown in perspective in Figure 8, embraces the flange 21 and the plate 20 secured thereto, and each clamping member is a generally rectangular formation and has a semicircular opening 75, flanges 76, 77, and 78 at three sides thereof, and bolt receiving holes 79 and 80 in the corners, as best shown in Figure 8. When the two members 70 and 71 are disposed about the upper end of the valve housing 1, the flange 21 of the latter overlies the openings 75 in the members 70 and 71 but clears the corner portions in which the bolt receiving openings 79 and 80 are disposed. Cap screws 82 are inserted in these openings and then threaded into the opposite bosses 57 so that when the screws 82 are tightened the members 70 and 71 hold the valve housing up in position with respect to the housing 50, but when the screws 82 are loosened, the valve housing 1 may be turned to any position therein. After the valve housing 1 has been placed in the proper position the set screws 82 may be tightened which will clamp the housings 1 and 50 together. While reference is made to the rotation of the valve housing 1 with respect to the housing 50, it is to be understood that the housing 50 may be turned with respect to the housing 1 by the same action, as described above.

The operating linkage whereby the solenoid 60 controls the valve 16 is carried within the casing 50 and will now be described, particularly in connection with the swivel connection between the linkage and the valve 16, it being remembered that the valve 16 is connected to the valve housing 1 by a sealing bellows so that when the housing 1 turns with respect to the housing 50, the valve 16 moves with the housing 1, and hence the connection between the valve 16 and linkage must be such as to accommodate this relative movement.

The linkage for operating the valve 16 is indicated in its entirety by the reference numeral 90 and includes a generally U-shaped lever 91 pivotally mounted on a pin 92 which is held in position in apertured bosses 93 and 94 formed in the casing 51. The pin 92 is held in place by one or more screws 96. The sides 98 and 99 of the lever 91 are apertured, as best indicated in Figure 7, to receive a pin 101 on which the arms 102 and 103 of a U-shaped link 104 are swung. The intermediate portion of the link 104 is provided with an aperture 106 that receives a stem 107 formed on or carried by the upper end of the valve 16. A collar 108 is placed on the upper end of the stem 107 to connect the valve 16 and link 104 together against relatively axial movement but permitting rotation of one with respect to the other to form a swivel connection by which the valve 16 and associated parts may be turned or rotated with respect to the operating linkage for the valve. A roller 110 is mounted on the pin 101 between spaces 111 and 112 and forms means whereby swinging movement of the lever 91 about the pivot pin 92 downwardly moves the valve 16 to its closed position but without introducing any side thrust on the valve. Upward movement of the lever 91 will act through the link 104 to move the valve 16 upwardly to permit liquid to flow from the inlet chamber 8 upwardly through the bushing 15 to the outlet chamber 4.

A lever 120 is pivoted on a shaft 121 carried in any suitable manner by the casting 51, as by a pair of apertured bosses 123 and 124 formed on the side walls of the casing, as best shown in Figure 3. Preferably, the shaft or pin 121 is held in place by one or more screws 126 threaded into the boss apertures from the outside of the casing 51. The lever 120 has a pair of arms 129 and 130 which are apertured to receive a pin 132 on which the upper end of a generally U-shaped link 133 is pivoted. The lower end of the link 133 is pivoted on a pin 135 which extends through the outer end of the lever 91.

The other end of the lever 120 is formed with a pair of arms 141 and 142 which are apertured and receive a pin 144 that extends through the upper end of the solenoid armature 145. A U-shaped strap 148 is fastened on opposite sides of the plunger laminations 146 by any suitable means, such as rivets 150. The strap 148 and the plunger laminations 146 are bored, as at 153, to receive a pair of rubber bushings 154 and 155 through which the pin 144 is disposed, as best shown in Figure 6. Preferably, the rubber bushings 154 and 155 have heads or flanges 158 and 159 so that there is no electrical or metallic connection between the end of the arm 120 and the plunger 145.

The upper end of the strap 148 carries an etched plate 160, and underneath the plate 160 is a soft rubber washer or other suitable sealing member 161, both being held to the member 148 by a rivet 162 or the like. The upper portion of the casing 50 is closed by a cover 163 having an opening 164 formed therein in line with the plunger 145, which opening is adapted to be closed by the sealing washer 161. A spring 167 has a coiled portion disposed about the pivot shaft 121 and ends 168 and 169 engaging, respectively, the arm 120 and the portion 53a of the casing 50. As will be apparent, the action of the spring 167 is to hold the valve 16 down against its seat 15 against the pressure in the inlet. The cover 63 is held in place over the opening 62 by any suitable means such as screws 170, these being threaded into apertured bosses 171 formed in the casing 51. The solenoid 60 is provided with a soft insert 174 formed of sponge rubber or similar material so that when the solenoid 60 is actuated to draw the plunger 145 downwardly and open the valve, no metal-to-metal contact will be established, and if the solenoid 60 is energized by alternating current no undesirable vibrations will be set up. The rubber bushings 154 and 155 also serve to cushion the connection between the plunger 145 and the operating linkage 90 for controlling the valve 16.

The operation of the form of invention shown in Figures 1 to 8 is substantially as follows:

Fluid flowing from the inlet 11 to the outlet 5 is under the control of the valve 16, and the latter, in turn, is under control of the arm 120 in the casing 50. When the solenoid unit 60 is energized, the plunger 145 is drawn downwardly, swinging the arm 120 in a counterclockwise direction as viewed in Figure 1, which acts through the arm 120, link 133, and lever 91 to pull upwardly through the link 104 against the valve 16 to open the same which permits fluid to flow through the valve housing 1. It will be noted that in opening the valve the solenoid 60 pulls against the spring 167 but that the inlet pressure in the chamber 8 aids in opening the valve, the inlet pressure being greater than the outlet pressure in the chamber 4. Thus, the solenoid 60 in operation is required to overcome only the differential between the spring 167 and the inlet pressure effective on the valve 16. The spring 167 is, of course, strong enough to close the valve 16 against both the inlet and outlet pressures in the chambers 8 and 4.

When the valve 16 is opened, the bellows 37 is extended, drawing into the interior thereof a quantity of fluid from the chamber 4. When the current through the coil 60 is interrupted, the spring 167 acts immediately to close the valve. By virtue of the roller connection at 110 between the operating linkage and the valve 16, all side thrust on the valve is eliminated, thereby assuring that the valve 16 will be seated properly. The movement of the valve 16 towards its seat compresses the bellows 37, but before this can occur some of the fluid on the inside of the bellows must be expelled from the interior thereof through the clearance 35 (Figure 1). This causes the bellows 37 to act as a dashpot to prevent closing of the valve 16 too suddenly. If the valve 16 were permitted to close suddenly, water hammer might be set up in the associated piping, but by employing the bellows 37 as a dashpot, water hammer is effectively eliminated.

If it should be desired to change the location of the outlet 5 and the outlet 11 with respect to the casing 50, or vice versa, all that it is necessary to do is to loosen the cap screws 82 and turn either the casing 50 or the valve housing relative to the other and then tighten the cap screws.

Under certain conditions it might be desirable to open the valve 16 by hand, and this can be done conveniently by inserting a finger in the opening 164 and depressing the push plate 160 on the end of the arm 120. This makes it unnecessary to provide any piping by-passing the valve unit. The push plate 160 and opening 164 are on top of the casing 51 so as to be easily accessible.

A somewhat simplified form of the present invention is shown in Figures 9 and 10. In this form the valve housing is indicated at 201 and includes walls 202 and 203 forming an inlet chamber 204 and an outlet chamber 205. Bosses 206 and 207 provide for the usual coupling connections. The lower portion of the inlet chamber 204 includes a closure plate 209 fastened in place by any suitable means, such as cap screws 210. The plate 209 has a threaded opening 212 receiving a drain plug 213. The plate 209 is shouldered, as at 215, and receives a screen 216 clamped between the closure plate 209 and a shoulder 218 formed in the lower face of the housing wall 203. The wall 203 has a threaded opening 220 which receives a screw threaded plug 221 formed of any suitable material, such as stainless steel or the like, and is apertured to form a valve seat 222.

The housing 201 above the wall 202 is provided with a threaded section 230 in the lower portion of which a disc 231 is seated. A screw threaded ring 232 holds the disc in place against the shoulder formed by the wall 202, and the disc 231 is apertured to receive a reciprocable valve 235 which has a lower conical end 236 and an upper bifurcated end 237. A sealing bellows 240 is soldered or otherwise disposed about the opening in the plate 231 through which the valve extends, and at its upper end the head of the bellows 240 is sealed or otherwise rigidly fastened to the valve 235. The valve housing 201 is flanged as at 245 and apertured as at 246 to receive cap screws 247 which are screwed into threaded bosses 248 formed on the casing 249 which is adapted to be connected to the valve housing 201. A plate 250 is clamped between the valve housing 201 and the casing 249 and has a central opening 251 to serve as a guide for the upper end of the valve 235.

The casing 249 is substantially identical with the casing 50 described above, having a chambered section 253 to receive the solenoid 60. However, instead of taking out the solenoid connections 66 through a side opening, the casing 249 is formed with an opening 255 in an upper wall through which the leads 66 may be extended. At this portion of the casing 249 a side opening 256 is provided, but normally it is closed by a plate 257 held in place by screws 258, so that if it is desired to take the leads 66 out of the casing 249 in a horizontal direction, the plate 257 may be removed. The upper end of the casing 249 is closed by a cover plate 259.

The operating linkage for controlling the valve 235 is substantially the same as has been described above, and hence a number of the same reference numerals have been utilized. The solenoid 60 acts through the plunger 145 against the lever 120 which at its short end is connected to the link 133. In Figure 9, however, the link indicated at 91 in Figure 1 is not employed. Instead, a pair of right and left-hand plates or levers 260 and 261 (Fig. 10) are pivoted, as at 263, to lugs 264 formed on or carried by the plate 250. At the other end, the levers 260 and 261 have laterally outwardly deflected sections 265 and 266 which are pivotally connected by the pivot 135 to the lower end of the connecting link 133. Each of the plates or levers 260 and 261 is provided with a slot 268 in the central portion thereof, the slots 268 being in registry and arranged to receive a roller 270 which is mounted on a pin 271 extending through the arms 237a and 237b (Figure 10) at the upper bifurcated end 237 of the valve 235. The pin 271 is held in place, with the roller 270 in the slots 268, by cotter keys or the like.

In the form of the invention shown in Figure 9 there is no swivel connection between the operating linkage in the casing 249 and the valve 235. Instead, the plate or disc 231 can be shifted to various positions relative to the valve housing 201 after loosening the ring screw 232. The valve housing 201, being fastened to the casing 249 by four screws, may be disposed in any one of four different positions, and for this purpose the plate 231 is provided with two projections 275 (Figure 9) which seat in two of four recesses 276 (Figure 10) formed in the upper surface of the wall 202. Since the projections 275 are arranged at 180° apart about the axis of the valve 235, and since there are four openings 276 to receive the projections 275, it will be seen that by loosening the ring screw the plate 231 may be lifted out of the holes 276 and the valve housing then turned to any one of three other positions and the projections 275 then seated in two of the four recesses 276, after which the ring screw 32 can be tightened. The valve housing 201 can then be fastened to the casing 249 in its new position. While this construction does not afford the number of positions available in the construction shown in Figures 1 and 2, it has the advantage of being somewhat simpler.

The slots 268 are accurately formed in the plates 260 and 261, so that as the levers shift under the control of the linkage 120, 133, the center of pressure between the levers 260 and 261 and the valve 235 also shifts so that the thrust applied to the valve is always in an axial direction. By virtue of this construction, all side thrust on the valve is eliminated, thereby assuring that the valve 235 will be seated properly.

The operation of the unit shown in Figures 9 and 10 is substantially the same as in the construction shown in Figures 1 and 2. The spring 167 serves to hold the valve closed against the inlet pressure in the chamber 204, and when it is desired to open the valve 235, the solenoid 60 is energized, which pulls down the plunger 145 and causes the lever 120 to act through the link 133 to raise the valve into its open position. In this operation the solenoid 60 has to exert only sufficient power to overcome the differential between the inlet pressure in the chamber 204 and the pressure of the spring 167. When the current through the coil 60 is interrupted, the spring 167 returns the valve to its closed position against the inlet pressure, this movement of the valve being cushioned by the bellows 240 as described above in connection with Figure 1.

While I have shown and described above the preferred structure in which the principles of the present invention have been embodied, it is to be understood that my invention is not to be limited to the specific details shown and described, but that, in fact, widely different means may be employed in the practice of the broader aspects of my invention.

What I claim, therefore, and desire to secure by Letters Patent is:

1. A valve construction for a closed liquid-tight containing system and particularly adapted to prevent water hammer, comprising a valve housing having inlet and outlet chambers with a valve seat therebetween, both chambers being normally filled with substantially incompressible liquid, a valve member movable to close against said seat to shut off liquid flow therethrough, a bellows sealing said valve member to said housing, and means providing a restricted communication between the interior of said bellows and one of said chambers, the amount of restriction being sufficient to prevent water hammer by accommodating only a small rate of displacement of the liquid from the interior of said bellows.

2. A valve construction as defined in claim 1, further characterized by means for operating said valve member comprising means adapted to have sufficient force stored therein for moving said valve member into closed position against the hydraulic pressure in said one chamber, and releasable means for moving said valve member into open position, said means when released serving to release the force stored in said first means.

OSCAR F. CARLSON.